Nov. 20, 1928.

J. J. DE VRIES 1,692,250

SELF CLEANING CULTIVATOR SHOVEL

Filed Sept. 30, 1926

Witness
L. F. Sandberg

Inventor
Jacob J. DeVries
by Bair & Freeman Attorneys

Patented Nov. 20, 1928.

1,692,250

UNITED STATES PATENT OFFICE.

JACOB J. DE VRIES, OF SANBORN, IOWA.

SELF-CLEANING CULTIVATOR SHOVEL.

Application filed September 30, 1926. Serial No. 138,654.

The object of my invention is to provide a self cleaning cultivator shovel which is simple, durable, and inexpensive to manufacture.

A further object is to provide a cultivator shovel which will not clog with roots and earth and is therefore self cleaning.

A further object is to so construct my improved cultivator shovel that when a root comes in contact with the face thereof, one edge of the shovel will tend to raise the root out of the cultivated ground whereby it may be pulled across the face of the shovel and be entirely removed therefrom.

A further object is to so design the shovel that the roots will be pulled across the face thereof away from the row of plants being cultivated so that they are discharged between the rows of plants and not close to them.

A further object is to design such a shovel so that it can travel close to the plants without the sharp edge of the shovel injuring them.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

The ordinary cultivator shovel comprises a pair of slanting sharpened edges which when a root such as the wild rose or wild morning glory root comes in contact with the face thereof with portions of the root trailing behind on each side of the shovel, will carry the root along and clog the shovel with dirt. The tendency of these shovels to retain the root is caused by the dirt, as it is cultivated, tending to pull the root upward. However, the root catching on the sharpened edges, stays in the position that it first assumes with the trailing ends of the roots bent over the edges and there is no possibility of the root slipping upward and it is therefore necessary to frequently clean the shovel to prevent its clogging with roots and dirt when cultivating in ground where these roots are found. To overcome this tendency of the shovel to retain the roots, I have designed a shovel as illustrated in my drawings.

Figure 1:
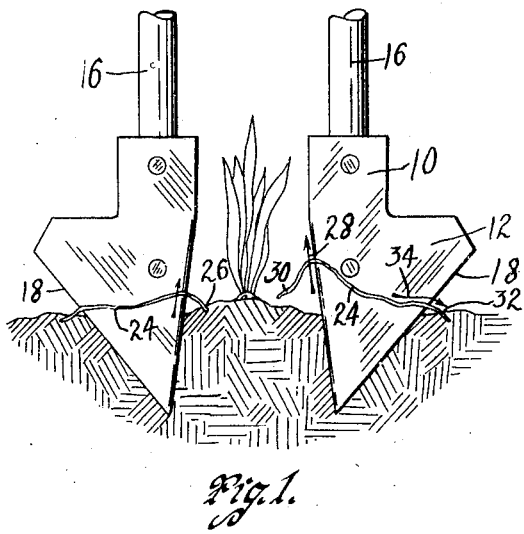
Figure 1 is a front elevation of a pair of my improved self cleaning cultivator shovels in working position with a plant which is being cultivated shown between them.
Figure 4:
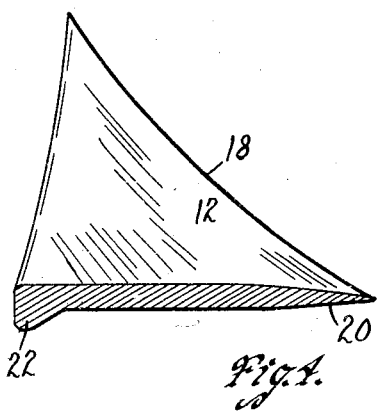
Figure 4 is a sectional view on the line 4—4 of Figure 2.
Figure 2:
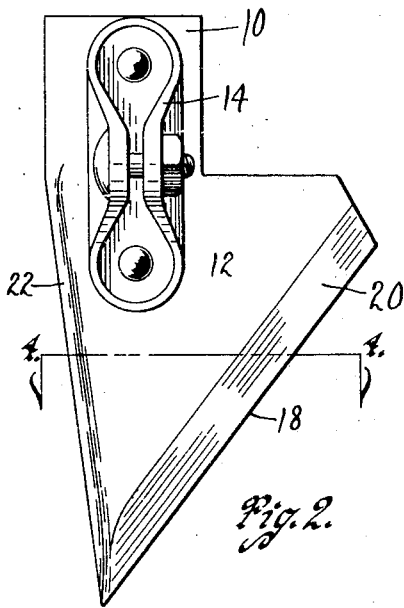
Figure 2 is a rear elevation of one of my shovels.
Figure 3:
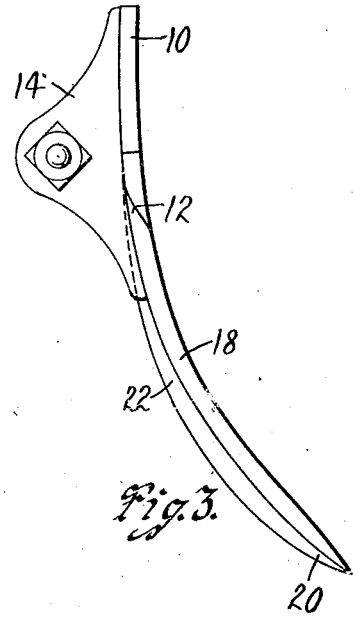
Figure 3 is a side elevation thereof.

The shovel comprises a shank 10 and plate 12. The usual clamp member 14 is provided for clamping the shovel to the shovel support members 16 found on the usual cultivator. The blade 12 has a slanting edge 18 which is sharpened as indicated at 20 for cultivating the soil through which the shovel travels. The shovels are used in pairs as illustrated in Figure 1 of the accompanying drawings with the slanting edges 18 away from each other. The opposite edge 22 of the blade 12 is thickened, as clearly illustrated in Figure 4 and is also rounded instead of being sharp as is usually the case with cultivator shovels. The purpose of this rounded edge 22 is illustrated in Figure 1 of the drawings.

Wild rose roots or wild morning glory roots 24 are very tough and not easily broken and in order to clear them from the shovel, it is necessary to have the rounded edge 22. The left hand shovel shows the root 24 just being engaged by the shovel and with the ends 26 thereof still in the ground. As the shovel travels along, the root may be pulled out of the ground but the soil being disturbed by the shovel, keeps falling over the root. However, the substantially vertical inclination and the roundedness of the edge 22 does not hinder the upward movement of the root 24 as shown at 28. This raises the end 30 of the root until it is free of the loosened soil but the end 32 is still being covered by the soil as it is disturbed by the shovel and the root therefore is pulled off in the direction of the arrow 34. I have used these shovels considerably and find that they are perfectly self cleaning of roots and inasmuch as roots hanging on the shovels is the main cause for the accumulation of earth on the shovel, these shovels are also kept clean of earth.

It may here be mentioned that it is not essential that the edge 22 be thickened as shown but if it is merely rounded, it will accomplish the same purpose and its inclination may vary from vertical to even a greater slant than I have shown and the shovel will still be self cleaning.

Some changes may be made in the construction and arrangement of the various parts of my invention, without departing from the real spirit and purpose of my invention, and it is my intention to cover by my claims, any modified forms of structure or use of mechanical equivalents, which may be reasonably included within their scope.

I claim as my invention:

In a device of the class described, a blade having one slanting edge and one substantially vertical thickened edge, said slanting edge being sharpened whereby weeds may be cut therewith when the blade is used as a cultivator shovel, said substantially vertical thickened edge being rounded whereby roots catching on the blade will slip upwardly along the substantially vertical edge for causing one end of the root to be pulled from the ground after which the root will be pulled across the face of said blade and will not catch thereon, said root in being so pulled, serving to keep said blade clean.

Des Moines, Iowa, Sept. 11, 1926.

JACOB J. DE VRIES.